J. M. MERROW.
TRIMMING CUTTER FOR SEWING MACHINES.
APPLICATION FILED DEC. 9, 1905.
907,624.
Patented Dec. 22, 1908.
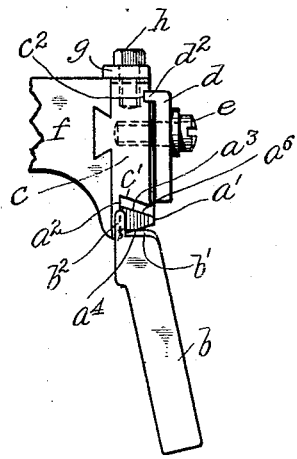
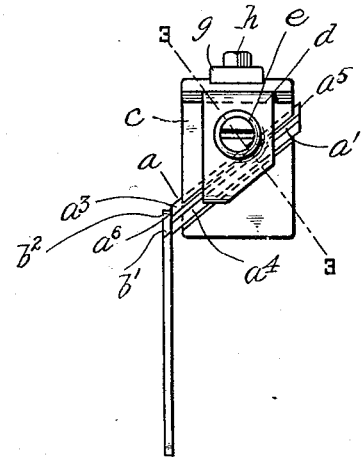
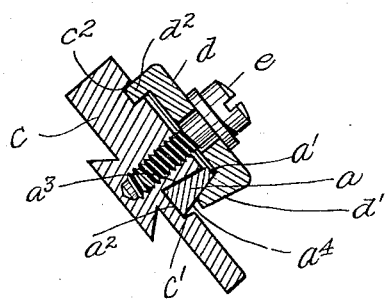
WITNESSES—
Alonzo R. Luther.
Thomas Durant.
INVENTOR—
Joseph M. Merrow
BY Church & Church
his ATTORNEYS—

UNITED STATES PATENT OFFICE.

JOSEPH M. MERROW, OF HARTFORD, CONNECTICUT, ASSIGNOR TO THE MERROW MACHINE COMPANY, OF HARTFORD, CONNECTICUT, A CORPORATION OF CONNECTICUT.

TRIMMING-CUTTER FOR SEWING-MACHINES.

No. 907,624.      Specification of Letters Patent.      Patented Dec. 22, 1908.

Application filed December 9, 1905. Serial No. 291,137.

*To all whom it may concern:*

Be it known that I, JOSEPH M. MERROW, citizen of the United States, residing in the city and county of Hartford, State of Connecticut, have invented certain new and useful Improvements in Trimming-Cutters for Sewing-Machines, of which the following is a full, clear, and exact description, reference being had to the accompanying drawings, forming a part of this specification, and to the figures and letters of reference marked thereon.

This invention relates to reversible trimming cutters its object being to provide a cutter having a cutting edge at each end, each of which may be ground in a single plane to sharpen its cutting edge, without changing the shape of the said ends, said cutter being reversible in its support that either end may be caused to coöperate with a companion cutter, when one of the cutters is suitably actuated.

The trimming mechanism shown is well adapted for use with sewing machines for trimming off the edges of the material.

As embodied in the accompanying drawings the invention is illustrated as follows:—Figure 1 is a side elevation of the trimming cutters, showing the reversible cutter suitably supported in its holder and a portion of the carrier on which the holder is secured. Fig. 2 is a front elevation of the parts shown in Fig. 1, omitting the carrier. Fig. 3 is a sectional view on a somewhat enlarged scale, showing the reversible cutter clamped in its holder, the section being taken on the line 3—3 of Fig. 2.

Throughout the several figures of the drawings, like letters and numerals of reference denote the same parts.

The letter $a$ denotes the reversible cutter as a whole. This cutter is made preferably from a bar of steel, shaped in cross section like an isosceles triangle or a wedge having its apex $a'$ preferably somewhat flattened. The base of the triangle is denoted by the letter $a^2$ and the two sides by the letters $a^3$ $a^4$ respectively.

The cutter $a$ is ground in a single plane at each end, the said planes of grinding being parallel with each other and preferably at such angles to the major axis of the bar as to give acute cutting edges at each end.

The side $a^3$ of the cutter $a$ at its junction with one of the ground ends of the cutter forms a cutting edge $a^5$ at that end of the cutter, while the side $a^4$ at its junction with the other ground end of the cutter forms a cutting edge $a^6$ at the other end of the cutter.

The cutter $a$ is preferably, though not necessarily, the actuated cutter and is so supported that its ground ends move in the planes in which they are ground. The companion cutter $b$ is also suitably supported and has a cutting edge $b'$ adapted to engage with the cutting edges $a^5$ $a^6$ at the ends of the cutter $a$ and the cutter $b$ has also a finger $b^2$ which is adapted to always remain in engagement with the cutter $a$ to insure the proper coaction between the cutters.

The cutter $a$ as shown, is supported in a holder $c$ having a groove $c'$ to receive the cutter and for so locating the same that its ground ends shall be parallel with the adjacent face of the companion cutter $b$. The cutter $a$ is placed in the groove $c'$ either end around, with its base $a^2$ against the bottom of the said groove one side wall of which groove is undercut to fit the shape of the cutter sides $a^3$ or $a^4$ as the case may be. The cutter $a$ is retained in the groove $c'$ by a clamp $d$ which is secured to the holder by a screw $e$ and is preferably provided with a rib $d'$ which may so engage the cutter as to force it against the side and bottom walls of the groove $c'$. The clamp $d$ is also shown as provided with a rib $d^2$ to receive which the holder $c$ is grooved at $c^2$ and thus the rotation of the clamp upon its screw, upon the loosening of the latter, is prevented. The holder $c$ is also shown as adjustably supported upon a carrier $f$ between which and the holder there is a dovetail connection. The adjustment of the holder upon the carrier is laterally of the planes of the ground ends of the cutter $a$ when the latter is in position on the holder. To retain the holder in adjusted position on the carrier, a clamp $g$ is provided secured to the holder by a screw $h$ which latter is adapted to force the clamp into binding contact with the carrier and holder.

When the cutter $a$ is to be the moving cutter, the carrier $f$ is actuated by any known suitable means to cause proper coaction between the cutters.

With the described means for supporting the cutter $a$ it will be seen that by sliding the cutter in the groove $c'$ the ends of the cutter are raised or lowered and thus the desired elevation of the cutting edge engaging the companion cutter $b$ can be readily controlled, also that by adjusting the holder on its carrier, proper contact between the cutters can be readily attained.

Having thus described my invention, what I claim as new and desire to secure by Letters Patent, is:—

As a new article of manufacture, a reversible cutter in bar form with two of its sides at equal angles with its base and the ends of the bar being made parallel to each other and oblique to the sides of the bar whereby the junction of one side with one end face forms an acute angled cutting edge and the junction of the opposite side and opposite end face forms also an acute angled cutting edge, substantially as described.

JOSEPH M. MERROW.

Witnesses:
ALONZO M. LUTHER,
W. C. W. STEWART.